United States Patent
Wang et al.

(10) Patent No.: US 10,763,705 B2
(45) Date of Patent: Sep. 1, 2020

(54) METHOD OF PAIRING RECEIVER WITH WIRELESS CHARGER TRANSMITTER

(71) Applicant: NXP USA, INC., Austin, TX (US)

(72) Inventors: Li Wang, Suzhou (CN); Dechang Wang, Suzhou (CN); Dengyu Jiang, Suzhou (CN); Huan Mao, Suzhou (CN)

(73) Assignee: NXP USA, Inc., Austin, TX (US)

( * ) Notice: Subject to any disclaimer, the term of this patent is extended or adjusted under 35 U.S.C. 154(b) by 80 days.

(21) Appl. No.: 16/238,333

(22) Filed: Jan. 2, 2019

(65) Prior Publication Data

US 2020/0119594 A1   Apr. 16, 2020

(30) Foreign Application Priority Data

Oct. 11, 2018  (CN) .................. 2018 1 11870567

(51) Int. Cl.
| | | |
|---|---|---|
| H02J 50/40 | (2016.01) | |
| H02J 50/80 | (2016.01) | |
| H02J 50/10 | (2016.01) | |
| H02J 50/70 | (2016.01) | |
| H04W 76/11 | (2018.01) | |

(52) U.S. Cl.
CPC .............. H02J 50/40 (2016.02); H02J 50/10 (2016.02); H02J 50/70 (2016.02); H02J 50/80 (2016.02); H04W 76/11 (2018.02)

(58) Field of Classification Search
CPC .. H02J 50/40; H02J 50/80; H02J 50/10; H02J 50/70; H04W 76/11
See application file for complete search history.

(56) References Cited

U.S. PATENT DOCUMENTS

| | | |
|---|---|---|
| 5,008,879 A | 4/1991 | Fischer et al. |
| 5,077,732 A | 12/1991 | Fischer et al. |
| 8,299,753 B2 | 10/2012 | Hui |
| 8,519,668 B2 | 8/2013 | Hui |
| 8,796,989 B2 | 8/2014 | Lee et al. |
| 9,059,598 B2 | 6/2015 | Kang et al. |
| 9,142,990 B2 | 9/2015 | Keeling et al. |
| 9,413,175 B2 | 8/2016 | Park et al. |
| 9,438,067 B2 | 9/2016 | Na et al. |
| 9,590,447 B2 | 3/2017 | Knepper |
| 9,620,996 B2 | 4/2017 | Zeine et al. |
| 9,780,572 B2 | 10/2017 | Standke et al. |
| 2009/0140691 A1 | 6/2009 | Jung |
| 2010/0151808 A1 | 6/2010 | Toncich et al. |

(Continued)

OTHER PUBLICATIONS

Wireless Power Consortium, The Qi Wireless Power Transfer System Power Class 0 Specification, Parts 1 and 2: Interface Definitions Version 1.2.4, Feb. 2018.

(Continued)

*Primary Examiner* — Carlos Amaya

(57) ABSTRACT

A wireless charging system (transmitter) has multiple transmit coils that allows for multiple receiver devices (receivers), such as cell phones, to be charged simultaneously. The receivers send data packets that include a receiver ID to the transmitter so that one of the transmitter coils can be paired with a respective one of the receivers. The transmitter can then distinguish between the communications with the receivers using the IDs such that communications with receivers connected with adjacent ones of the transmitter coils do not interfere with each other.

16 Claims, 3 Drawing Sheets

(56) References Cited

U.S. PATENT DOCUMENTS

| | | |
|---|---|---|
| 2010/0253281 A1 | 10/2010 | Li |
| 2011/0215756 A1 | 9/2011 | Shimizu |
| 2013/0127405 A1 | 5/2013 | Scherer et al. |
| 2013/0154557 A1 | 6/2013 | Lee et al. |
| 2014/0191568 A1 | 7/2014 | Partovi |
| 2015/0256226 A1* | 9/2015 | Lin .................. H02J 50/90 |
| | | 307/104 |
| 2015/0303699 A1 | 10/2015 | Wagman et al. |
| 2015/0326058 A1 | 11/2015 | Chu |
| 2016/0197494 A1* | 7/2016 | Kwon ................ H02J 5/005 |
| | | 307/104 |
| 2016/0233728 A1 | 8/2016 | Park et al. |
| 2017/0093197 A1 | 3/2017 | Gao et al. |
| 2018/0219403 A1 | 8/2018 | Schneider |
| 2018/0219405 A1 | 8/2018 | Qiu et al. |
| 2018/0239408 A1 | 8/2018 | Kuchibhatla et al. |
| 2018/0301933 A1 | 10/2018 | Lee et al. |
| 2019/0173309 A1 | 6/2019 | Jung |
| 2019/0296583 A1* | 9/2019 | So ..................... H02J 7/025 |

OTHER PUBLICATIONS

U.S. Appl. No. 15/452,479; 23 pages (filed Jun. 25, 2019).
Non Final Office Action; U.S. Appl. No. 16/238,333; 9 pages (dated May 26, 2020).

\* cited by examiner

METHOD OF PAIRING RECEIVER WITH WIRELESS CHARGER TRANSMITTER

BACKGROUND

The present invention generally relates to wireless charging devices and, more particularly, to a wireless charging device that can communicate with and charge multiple receiver devices.

Wireless chargers are convenient because they allow electronic devices to be charged without requiring the devices to be plugged into electrical sockets. Wireless chargers have been developed that can simultaneously charge multiple devices (receivers). In operation, the receivers are placed on corresponding coils of the charger, which transmit energy to the receivers. The coils also are used for communications between the charger and the receivers. However, the coils can interfere with the communications of adjacent coils and receivers.

It would be advantageous to have a communication method for wireless chargers that distinguishes between multiple receiver devices and avoids interference.

SUMMARY

This summary is provided to introduce a selection of concepts in a simplified form that are further described below in the Detailed Description. This summary is not intended to identify key or essential features of the claimed subject matter, nor is it intended to be used to limit the scope of the claimed subject matter.

In one embodiment, the present invention provides a communication method between a wireless charger transmitter and a receiver device, where the transmitter has multiple transmitter coils for simultaneously charging respective multiple receiver devices by transmitting charging power to the receiver devices. The method includes: the receiver device transmitting a first data packet to the transmitter in response to a power signal from the transmitter; the receiver device transmitting one or more second data packets to the transmitter for configuring the transmitter to charge the receiver device; and the receiver device transmitting a third data packet to the transmitter to permit the transmitter to control the charging power provided to the receive device. At least the third packet includes an identifier associated with the receiver device, which allows the transmitter to distinguish between multiple receiver devices.

In another embodiment, the present invention provides a communication method between a wireless charger transmitter and a receiver device, where the transmitter has multiple transmit coils for simultaneously charging respective multiple receiver devices by transmitting charging power to the receiver devices. The method includes: the transmitter emitting a power signal to the receiver device; the transmitter receiving a first data packet from the receiver device and assigning a receiver ID to the receiver device; the transmitter receiving one or more second data packets from the receiver device, wherein the second data packets include the receiver ID, and the transmitter configuring one of the transmit coils to provide charging power to the receiver device; and the transmitter receiving a third data packet from the receiver device, wherein the third data packet includes the receiver ID, and the transmitter controlling charging power sent to the receiver device based on data in the third data packet.

In yet another embodiment, the present invention provides a communication method between a wireless charger transmitter and a receiver device, where the transmitter has multiple transmit coils for simultaneously charging respective multiple receiver devices by transmitting charging power to the receiver devices. The method includes: during a power transfer phase, providing charging power from the transmitter to a selected one of the receiver devices; and controlling the charging power in response to a control data packet received from the selected one of the receiver devices, where the control data packet includes an identifier associated with the selected receiver device.

BRIEF DESCRIPTION OF THE DRAWINGS

So that the manner in which the above recited features of the present invention can be understood in detail, a more detailed description of the invention may be had by reference to embodiments, some of which are illustrated in the appended drawings. The appended drawings illustrate only typical embodiments of the invention and should not limit the scope of the invention, as the invention may have other equally effective embodiments. The drawings are for facilitating an understanding of the invention and thus are not necessarily drawn to scale. Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
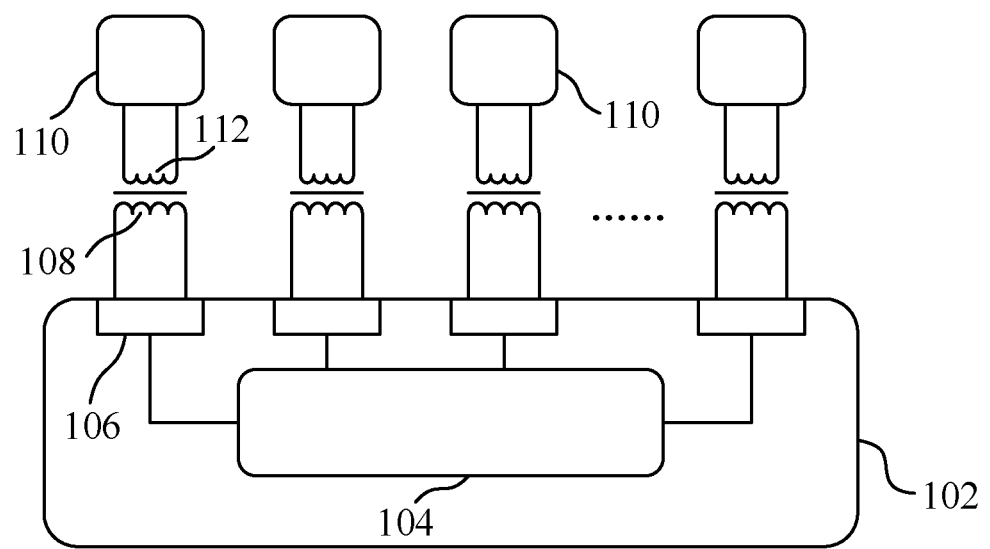
FIG. 1 is a schematic block diagram of a wireless charger having multiple transmitter coils and multiple receiver devices coupled with respective ones of the transmitter coils.

FIG. 1 is a schematic block diagram of a wireless charger 102 including multiple transmitters that support charging multiple receiver devices 110. The wireless charger 102 includes a controller 104, multiple drivers 106, and multiple transmitter coils 108 connected to corresponding ones of the multiple drivers 106. The controller 104 controls the multiple drivers 106 to drive the corresponding transmitter coils 108. The controller 104 may comprise a single controller circuit that manages the coils 108 or multiple controller circuits, each of which manages a respective one of the coils 108. Each transmitter coil 108 and the corresponding driver 106 form a transmitter that generates wireless charging power. By having multiple transmitter coils 108 (i.e., multiple transmitters), the wireless charger 102 is able to simultaneously charge multiple receiver devices 110. Each receiver device 110 includes a receiver coil 112 that couples with one of the transmitter coils 108 to both receive power from and communicate with the wireless charger 102. The wireless charger 102 communicates with the receiver device 110 using, for example, an in-band ASK (Amplitude Shift Keying) communication scheme.

In a preferred embodiment, the transmitter coils 108 are physically distributed in the wireless charger 102 in a line or in an array. When the multiple transmitters communicate with the corresponding multiple receiver devices 110, inevitably there will be some signal interference. For example, in a typical application where the transmitters and the receiver devices 110 communicate using the "Qi" protocol, the transmitters receive control data from the receiver devices 110 in the form of packets. Since the packets are broadcasted by the receiver devices 110 wirelessly, interference can occur when packets are received by a neighboring transmitter coil 108 that is not coupled with the broadcasting receiver device. This undesirable interference can interrupt or even corrupt the ongoing operation of the transmitter. The present invention uses modified data packets for communications between a receiver and a transmitter to avoid interference. For example, in the Qi protocol, a communication packet comprises a preamble, a header, a message and a checksum. However, as will be discussed in more detail below with reference to FIGS. 3 and 4, in the present invention, the data packet also includes a device ID field, which allows a transmitter to determine if a received data packet is from a paired receiver device. If the wireless charging system supports bi-directional communications (Tx to Rx(FSK) and Rx to Tx(ASK)), then the device ID can be dynamically assigned by the transmitter based on its charging status. For example, when the transmitter obtains the first channel signal, it can feed back the device index number to this receiver device, like 0X01, then the receiver device can integrate this ID into the communication packets it later sends to the transmitter. After that, the transmitter will be able to determine the signal source by checking the ID number. For example, if the channel1 transmitter is paired with a channel1 receiver device, then if the channel1 transmitter receives a data packet with channel2's ID, the channel1 transmitter will abandon the packet and continue checking for data packets from the channel1 receiver device. For different receiver devices, the ID numbers are different.

Figure 2:
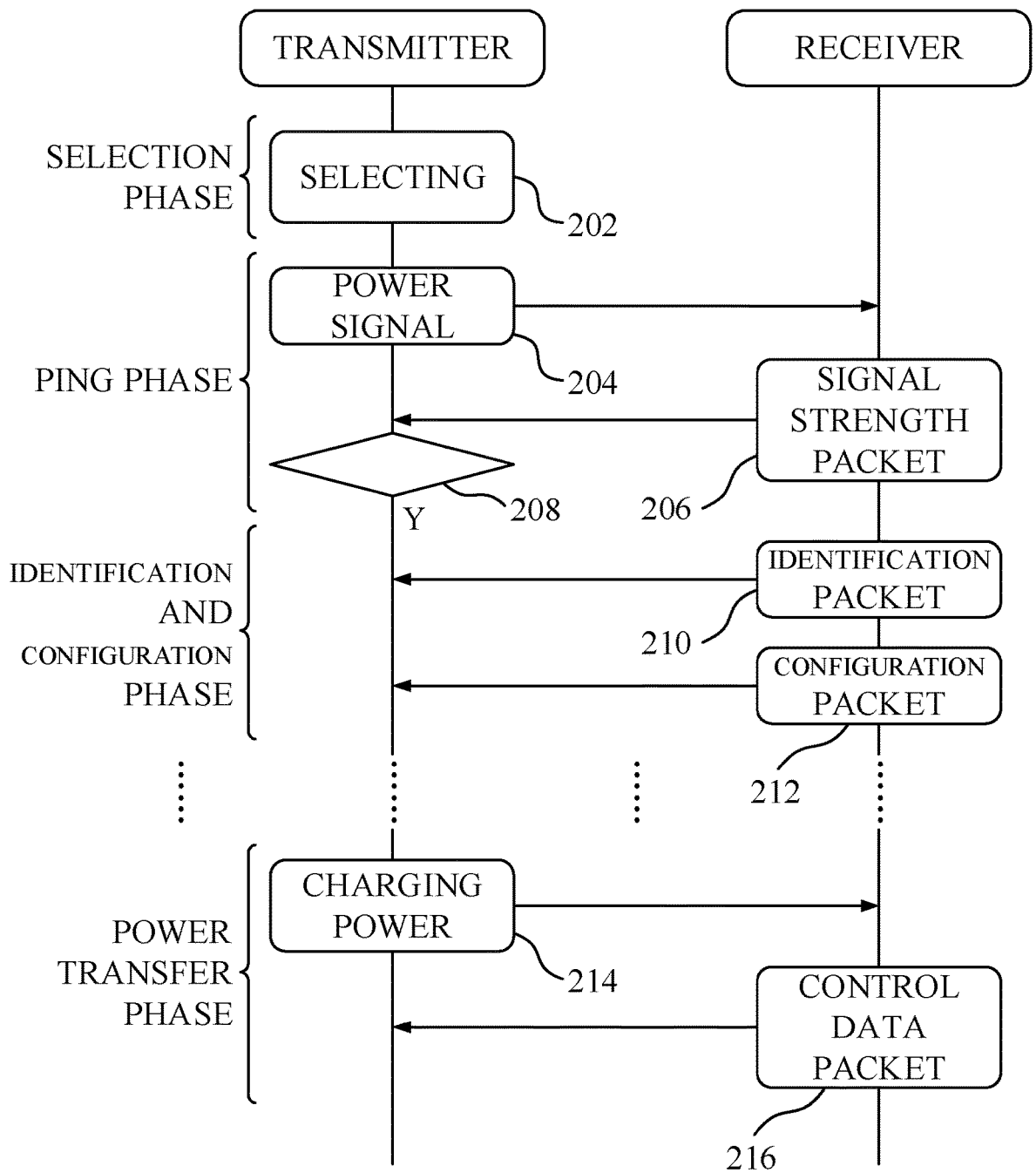
FIG. 2 is a flow chart of a method for communication between the wireless charger and the receiver devices according to an exemplary embodiment of the present invention.

FIG. 2 is a flow chart of a method for communicating between the wireless charger 102 (the transmitter) and the receiver devices 110 in accordance with an embodiment of the present invention.

The communication method starts at block 202, which is a selection phase, when the transmitter determines that there is a receiver device 110 within an operational range of one of the transmitter coils 108 and selects the receiver device 110 for wireless charging. After the selection phase, the transmitter enters a ping phase, where the transmitter applies a power signal on the transmitter coil 108 to which the receiver coil 112 of the receiver device 110 is coupled, as shown in block 204. In response, the receiver device 110 transmits a signal strength data packet to the transmitter at block 206, and then, at block 208, the transmitter determines whether or not to enter a next phase, which is an identification and configuration phase. For example, in the Qi protocol, the transmitter enters the identification and configuration phase if the signal strength data packet is received before the power signal applied on the transmitter coil 108 reaches 50% of a stable level. It should be noted that in FIG. 2, signals passed from the transmitter to the receiver device 110 and from the receiver device 110 to the transmitter are indicated with horizontal arrows. For example, at block 204, the horizontal arrow indicates that the power signal is sent from the transmitter to the receiver device 110.

If the transmitter enters the identification and configuration phase, then the receiver device 110 transmits a sequence of an identification packet and a configuration packet, respectively, at blocks 210 and 212. The transmitter uses the identification and configuration data packets to initiate and prepare to provide charging power to the receiver device 110. These data packets will be described in more detail with reference to FIGS. 3 and 4. On the other hand, if the transmitter does not enter the identification and configuration phase, the transmitter removes the power signal from the transmitter coil 108.

After the identification and configuration phase, the communication method may execute optional phases, for example, a negotiation phase and a calibration phase, followed by a power transfer phase. During the power transfer phase, at block 214, the transmitter provides and controls the charging power provided to the receiver device 110. The receiver device 110 transmits control data packets to the transmitter at block 216, and the transmitter uses the information in the control data packets to control the charging power.

Figure 3:
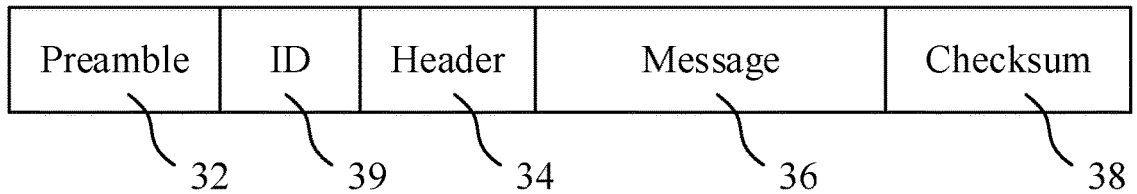
FIG. 3 is a schematic diagram showing a format of a data packet according to an embodiment of the present invention.

FIG. 3 is a block diagram showing a format of a data packet 30 generated by the receiver device 110 and sent to the transmitter. Each packet 30 includes a preamble 32, a header 34, a message 36, and a checksum 38, defined for example in Power Class 0 Specification presented by the Wireless Power Consortium. Thus, these data fields 32-38 are understood by those of skill in the art. In other embodiments, other formats may be used for communication between the transmitter and the receiver device 110.

However, in a presently preferred embodiment, the control data packet includes an identifier 39. The identifier 39 is associated with the receiver device 110. That is, the identifier 39 is used to pair the receiver device 110 with a particular one of the transmitter coils 108. Then, if the transmitter coil 108 receives a data packet from a receiver device 110 that is paired with an adjacent transmitter coil, once the transmitter parses the control data packet including the ID field 39, then the transmitter will know that the received data packet should be discarded because it did not come from a paired receiver.

In one embodiment, the identifier 39 is defined by the transmitter and sent to the receiver device 110 so that when the receiver device 110 generates a control data packet 30, the packet 30 includes the ID 39 provided by the transmitter. In other embodiments, the identifier 39 can be generated by the receiver device 110 itself. As shown in FIG. 3, in the presently preferred embodiment, the identifier 39 is located in the packet 30 between the preamble 32 and the header 34. However, in other embodiments, the identifier 39 can be located in a different segment of the packet 30, but preferably after the preamble 32, because the preamble 32 is used by the transmitter to synchronize with the incoming data and accurately detect the start bit of the following data field.

Figure 4:
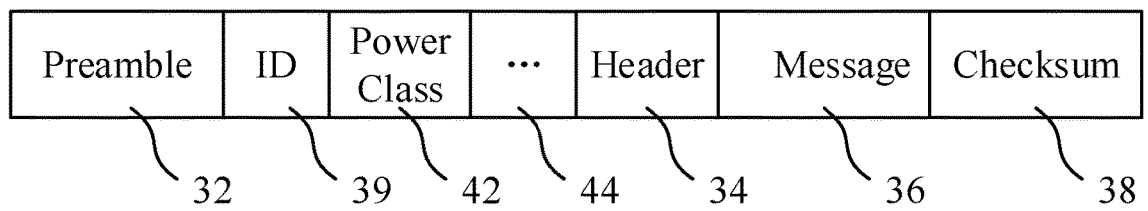
FIG. 4 is a schematic diagram of a format of a data packet according to another embodiment of the present invention.

FIG. 4 illustrates an extended packet format 40 in accordance with an alternative embodiment of the present invention. The extended packet 40 includes the preamble 32 as well as the identifier 39, the header 34, the message 36, and the checksum 38. The extended packet 40 also optionally includes a power class 42 of the receiver device 110, the type 44 of the receiver device 110, and a protocol version 46 supported by the receiver device 110. The described data fields in the extended packet 40 are inherent with the receiver device 110 and are known, for example presented in the Qi specification, and will not be described in detail here.

Using the identifier 39, one of the multiple transmitters of the wireless charger 102 can be paired with a receiver device 110.

Figure 5:
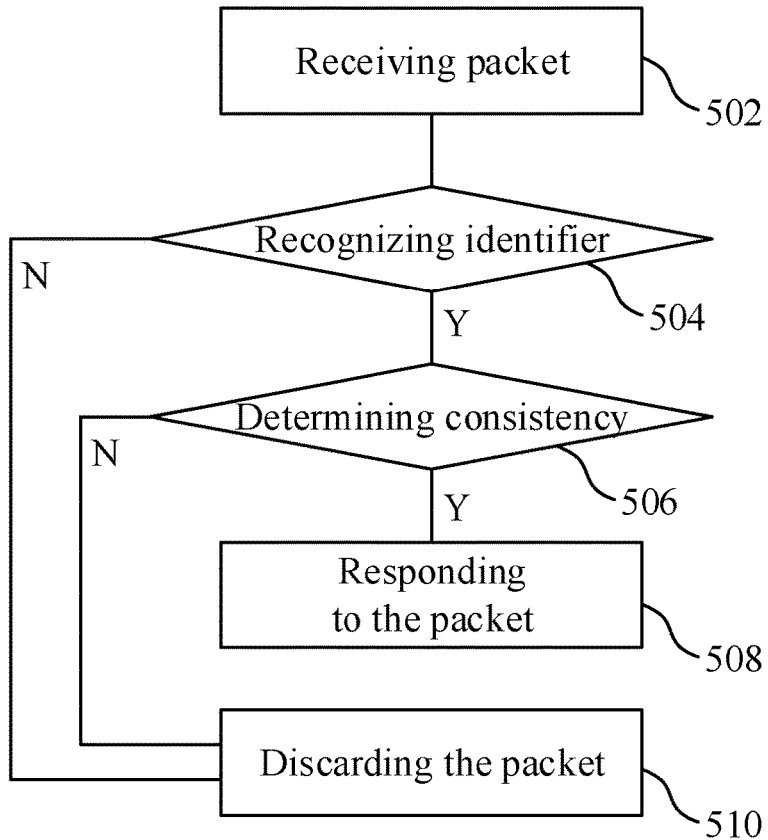
FIG. 5 is a flow chart of a method performed by the transmitter for communication between the transmitter and one or more receiver devices in accordance with an embodiment of the present invention.

FIG. 5 is a flow chart illustrating the steps performed by the transmitter in a communication sequence between the transmitter and a receiver device 110. At step 502, the transmitter receives a data packet from a receiver device 110, and at step 504, the transmitter parses the data packet. Data packet parsing is known, except in accordance with the present invention, the data packet includes the identifier 39, so at step 504, the transmitter checks whether an identifier is included in the packet. Referring back to FIG. 3, recognition of the identifier 39 begins with recognizing the preamble. The existence of the identifier 39 will be recognized after the preamble is recognized. For example, if the transmitter detects '1111', that pattern indicates the preamble. Then the next field is expected to be the identifier. On the other hand, if the transmitter does not detect a series of "1" bits within a string of maximumly allowed bits, for example 25 bits, the transmitter determines that the packet has not been correctly received, and does not proceed to recognize the identifier 39.

If the packet includes the identifier 39, the transmitter determines if the identifier 39 is the same as the registered identifier in step 506. As previously discussed, the identifier 39 may be assigned dynamically to the receiver device 110 by the transmitter, in which case the registered identifier is the dynamically assigned identifier. When the expected identifier is generated by the receiver device 110 itself, then the registered identifier is the generated identifier, and is registered, for example, by the transmitter in response to receipt of the identification packet in the identification and configuration phase.

If in step 506 it is determined that the identifier contained in the packet is the same as the registered identifier, then the transmitter responds in step 508. Otherwise, if the identifier contained in the packet does not match the registered identifier, then the transmitter discards the packet in step 510. If in step 504 the transmitter does not detect the existence of the identifier in the received packet, then the transmitter goes to step 510 and discards the packet.

The transmitter can dynamically issue the identifier or an inherent identifier of the receiver device can be used to distinguish the receiver device from other receiver devices so that a transmitter coil 108 can be paired with the receiver device and thus, potential interference from other receiver devices can be avoided. The transmitter identifies the receiver device using the identifier contained in the regular communication packets, so that the transmitter can assign one of its coils 108 to communicate exclusively with the paired receiver device without being disturbed by neighboring devices. The present invention provides modified communication packet definitions, based on the original protocol. Using dynamic ID distribution, the transmitter can distinguish between the different receiver devices coupled to its coils, making in-band communications more stable and reliable.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are intended merely to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

The invention claimed is:

1. A communication method between a wireless charger and a receiver device, wherein the wireless charger includes a plurality of transmitters for simultaneously charging a corresponding plurality of the receiver devices, wherein each transmitter of the plurality of transmitters includes a transmitter coil and a driver, the method comprising:

the receiver device transmitting a first data packet in response to a power signal from a selected one of the transmitters;

the receiver device transmitting one or more second data packets, wherein the selected transmitter is configured in accordance with the one or more second data packets to provide charging power to the receiver device; and the receiver device transmitting a third data packet, wherein the selected transmitter provides and controls the charging power to the receiver device in response to the third data packet;

wherein at least the third data packet comprises an identifier associated with the receiver device; and further comprising pairing the selected transmitter with the receiver device by:

the selected transmitter parsing the third data packet and recognizing that the third data packet includes the identifier;

the selected transmitter determining that the identifier is a registered identifier of the receiver device;

the selected transmitter responding to the third data packet in response to the transmitter determining that the identifier is the registered identifier of the receiver device; and the selected transmitter discarding the third data packet when the transmitter determines that the identifier does not belong to the receiver device.

2. The method of claim 1, further comprising:

the selected transmitter issuing the identifier to the receiver device; and the receiver device including the identifier in at least the third data packet.

3. The method of claim 1, further comprising:
the receiver device generating the identifier; and
the receiver device generating at least the third data packet to include the generated identifier.

4. The method of claim 1, wherein the receiver device generates at least the third packet by:
generating a preamble; and
including the preamble and the identifier in the third data packet.

5. The method of claim 4, further comprising:
the receiver device generating at least one additional data field including at least one of a power class of the receiver device, a type of the receiver device, and a protocol version supported by the receiver device, and including the at least one additional data field at least in the third data packet.

6. The method of claim 1, wherein the receiver device generates the one or more second data packets by:
generating an identification packet; and
generating a configuration packet,
wherein the transmitter is initiated to provide the charging power in response to receipt of the identification and configuration packets.

7. A communication method between a wireless charger and a receiver device, wherein the wireless charger includes a plurality of transmitters for simultaneously charging a corresponding plurality of the receiver devices, wherein each transmitter of the plurality of transmitters includes a transmitter coil and a driver, the method comprising:
providing charging power simultaneously from the plurality of transmitter coils of the plurality of transmitters to the corresponding plurality of receiver devices, including;
sending a power signal by a selected one of the transmitters to a receiver device located next to the selected transmitter;
the selected transmitter receiving a first data packet from the receiver device in response to the power signal;
the selected transmitter receiving one or more second packets from the receiver device, wherein the selected transmitter is configured to provide charging power to the receiver device using the one or more second data packets; and
the selected transmitter receiving a third data packet from the receiver device, wherein the selected transmitter uses the third data packet to control the charging power,
wherein at least the third data packet comprises an identifier associated with the receiver device; and
further comprising pairing the selected transmitter with the receiver device by:
the selected transmitter parsing the third data packet and recognizing that the third data packet includes the identifier;
the selected transmitter determining that the identifier is a registered identifier of the receiver device;
the selected transmitter responding to the third data packet in response to the transmitter determining that the identifier is the registered identifier of the receiver device; and
the selected transmitter discarding the third data packet when the transmitter determines that the identifier does not belong to the receiver device.

8. The method of claim 7, further comprising:
the selected transmitter issuing the identifier to the receiver device, wherein the identifier is included in at least the third data packet.

9. The method of claim 7, wherein the identifier is provided to the selected transmitter by the receiver device.

10. The method of claim 7, wherein the first, second and third data packets include a preamble and the identifier.

11. The method of claim 10, wherein at least the third data packet includes at least one of a power class of the receiver device, a type of the receiver device, and a protocol version of a protocol supported by the receiver device.

12. The method of claim 7, wherein the one or more second data packets include an identification packet and a configuration packet.

13. A communication method between a wireless charger and a receiver device, wherein the wireless charger includes a plurality of transmitters for simultaneously charging a corresponding plurality of the receiver devices, wherein each transmitter of the plurality of transmitters includes a transmitter coil and a driver, the method comprising:
providing charging power simultaneously from the plurality of transmitter coils of the plurality of transmitters to the corresponding plurality of receiver devices, including;
during a power transfer phase, providing charging power from a selected one of the transmitters to a selected one of the receiver devices; and
controlling the charging power by the selected transmitter in response to a control data packet received from the selected receiver device, wherein the control data packet includes an identifier associated with the selected receiver device,
wherein the identifier is used to pair the selected transmitter with the selected receiver device;
wherein the selected transmitter receives data packets from one or more of the receiver devices and only processes data packets that include the identifier;
wherein the selected transmitter discards data packets that do not include the identifier.

14. The method of claim 13, wherein the identifier is defined by the selected transmitter and provided to the selected receiver device by the selected transmitter.

15. The method of claim 13, wherein each receiver device includes a unique identifier and the selected receiver provides its unique identifier to the selected transmitter.

16. The method of claim 13, further comprising:
a ping phase in which the selected transmitter sends a power signal to the selected receiver device and the selected receiver device responds by sending a signal strength data packet to the selected transmitter; and
an identification and configuration phase in which the selected receiver devices sends one or more second data packets to the selected transmitter and the selected transmitter parses the one or second data packets and uses the identifier to determine that the second data packets were transmitted by the selected receiver device and wherein the selected transmitter uses the second data packets to configure itself for providing the charging power.

* * * * *